(12) United States Patent
Wei

(10) Patent No.: US 12,384,529 B2
(45) Date of Patent: Aug. 12, 2025

(54) LANDING GEAR AND UNMANNED AERIAL VEHICLE

(71) Applicant: AUTEL ROBOTICS CO., LTD., Shenzhen (CN)

(72) Inventor: Xinfu Wei, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 18/425,664

(22) Filed: Jan. 29, 2024

(65) Prior Publication Data

US 2024/0166341 A1 May 23, 2024

Related U.S. Application Data

(63) Continuation of application No. PCT/CN2022/105442, filed on Jul. 13, 2022.

(30) Foreign Application Priority Data

Jul. 30, 2021 (CN) .......................... 202110873762.2

(51) Int. Cl.
*B64C 25/24* (2006.01)
*B64C 25/20* (2006.01)
(Continued)

(52) U.S. Cl.
CPC .............. *B64C 25/24* (2013.01); *B64C 25/20* (2013.01); *B64U 60/40* (2023.01); *B64U 60/50* (2023.01)

(58) Field of Classification Search
CPC ......... B64U 60/40; B64C 25/20; B64C 25/24; B64C 25/18
See application file for complete search history.

(56) References Cited

U.S. PATENT DOCUMENTS 9,731,816 B2 * 8/2017 Harris, III ............... B64C 25/36
2013/0313360 A1 11/2013 Choi
(Continued)

FOREIGN PATENT DOCUMENTS

CN 101091829 A 12/2007
CN 201579788 U 9/2010
(Continued)

OTHER PUBLICATIONS

International Search Report mailed Sep. 28, 2022; PCT/CN2022/105442.

(Continued)

*Primary Examiner* — Joshua D Huson
*Assistant Examiner* — Peter A Taraschi
(74) *Attorney, Agent, or Firm* — Frank Gao, Esq.

(57) ABSTRACT

A landing gear and an unmanned aerial vehicle. The landing gear includes: a driving device; a first transmission shaft, connected to the driving device; and a first supporting leg, connected to the first transmission shaft. The driving device is configured to drive the first transmission shaft to rotate about a first direction and a second direction. The first transmission shaft drives the first supporting leg to rotate about the second direction. An included angle between the first direction and the second direction is an acute angle. In this way, when the driving device drives the first transmission shaft to rotate, the landing gear may be retracted or extended.

18 Claims, 4 Drawing Sheets

(51) Int. Cl.
  *B64U 60/40* (2023.01)
  *B64U 60/50* (2023.01)

(56) References Cited

U.S. PATENT DOCUMENTS

2018/0170528 A1* 6/2018 Roques .................. B64C 25/24
2020/0102068 A1* 4/2020 Mombrinie ............ B64C 29/00

FOREIGN PATENT DOCUMENTS

| | | |
|---|---|---|
| CN | 102431644 A | 5/2012 |
| CN | 103523209 A | 1/2014 |
| CN | 205345112 U | 6/2016 |
| CN | 107135909 A | 9/2017 |
| CN | 108146618 A | 6/2018 |
| CN | 108275260 A | 7/2018 |
| CN | 207758999 U | 8/2018 |
| CN | 211076320 U | 7/2020 |
| CN | 113525671 A | 10/2021 |
| CN | 113602483 A | 11/2021 |
| CN | 215944871 U | 3/2022 |
| JP | 2001347997 A | 12/2001 |
| JP | 2008000237 A | 1/2008 |

OTHER PUBLICATIONS

The First Chinese Office Action dated Sep. 10, 2024; Appln. No. 202110873762.2 with English Translation.
The Second Chinese Office Action dated Jan. 14, 2025; Appln. No. 202110873762.2 with English Translation.

* cited by examiner

LANDING GEAR AND UNMANNED AERIAL VEHICLE

CROSS-REFERENCE TO RELATED APPLICATIONS

This application is a continuation of International Patent Application No. PCT/CN2022/105442 filed on Jul. 13, 2022; which claims priority to Chinese Patent Application No. 2021108737622, filed on Jul. 30, 2021 and entitled "LANDING GEAR AND UNMANNED AERIAL VEHICLE", which is incorporated herein by reference in its entirety.

TECHNICAL FIELD

Embodiments of this disclosure relate to the field of landing gear technologies.

BACKGROUND

An unmanned aerial vehicle is referred to as a UAV for short. The unmanned aerial vehicle is a non-manned aircraft operated by a radio remote control device and a self-contained program control apparatus, or a non-manned aircraft completely or intermittently autonomously operated by an on-board computer. Currently, the unmanned aerial vehicle is widely used in fields such as aerial photography, agriculture, plant protection, micro self-portrait photography, express delivery transportation, disaster relief, wild animal observation, infectious disease surveillance, surveying and mapping, news reporting, power inspection, disaster rescue, and film and television photography. The unmanned aerial vehicle is provided with a landing gear. When the unmanned aerial vehicle lands on the ground or another object, the landing gear supports the unmanned aerial vehicle.

In a process of implementing this disclosure, the applicant of this disclosure found that, at present, the landing gear of the unmanned aerial vehicle is fixed and cannot be retracted. Therefore, it is inconvenient during performing tasks by the unmanned aerial vehicle.

SUMMARY

In view of the above problems, embodiments of this disclosure provide a landing gear and an unmanned aerial vehicle, the problems that the landing gear is fixed and cannot be retracted overcome or at least partially is resolved.

According to an aspect of this disclosure, a landing gear is provided and includes: a driving device; a first transmission shaft, where one end of the first transmission shaft is connected to the driving device; and a first supporting leg, connected to the other end of the first transmission shaft. The driving device is configured to drive the first transmission shaft to rotate about a first direction and a second direction. The first transmission shaft drives the first supporting leg to rotate about the second direction. An included angle between the first direction and the second direction is an acute angle.

According to an aspect in an embodiment of this disclosure, an unmanned aerial vehicle is provided and includes the landing gear.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding this disclosure, this disclosure is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", "inner", "outside", and similar expressions used in this specification are merely used for an illustrative purpose.

Unless otherwise defined, all descriptions of technical and scientific terms used herein have the same meaning as commonly understood by a person skilled in the art to which this disclosure belongs. Terms used in specification of this disclosure are merely intended to describe objectives of specific embodiments, but are not intended to limit this disclosure. A term "and/or" used in this specification includes any or all combinations of one or more related listed items.

Figure 1:
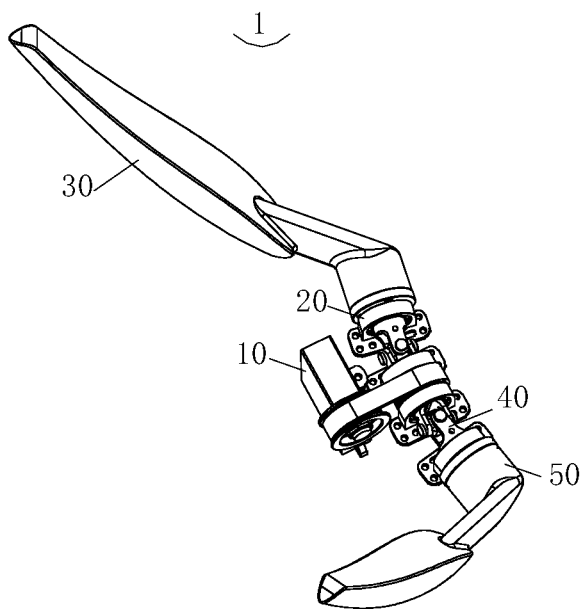
FIG. 1 is a schematic diagram of an implementation of a landing gear in one direction according to an embodiment of this disclosure.
Figure 2:
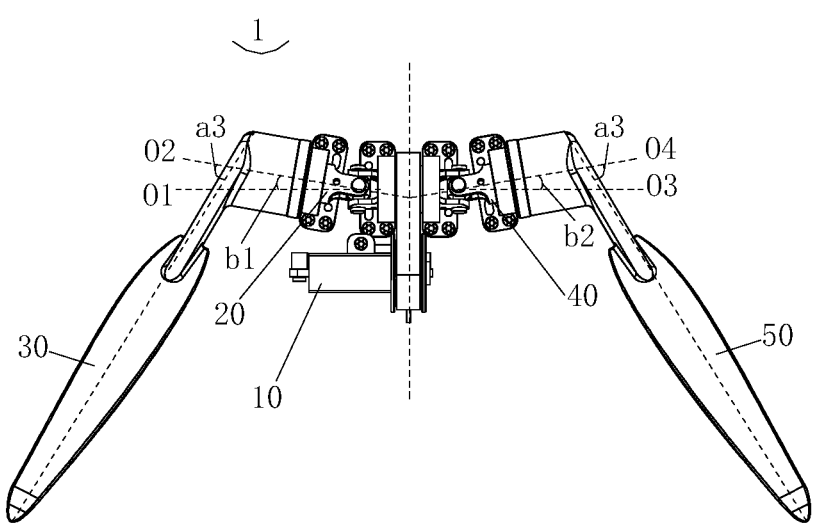
FIG. 2 is a schematic diagram of an implementation of a landing gear in another direction according to an embodiment of this disclosure.

Refer to FIG. 1 and FIG. 2. A landing gear 1 comprises a driving device 10, a first transmission shaft 20, a first supporting leg 30, a second transmission shaft 40, and a second supporting leg 50. The driving device 10 is connected to one end of the first transmission shaft 20. The first supporting leg 30 is connected to the other end of the first transmission shaft 20. The driving device 10 is configured to drive the first transmission shaft 20. The first transmission shaft 20 drives the first supporting leg 30 to rotate. The driving device 10 is connected to one end of the second transmission shaft 40. The second supporting leg 50 is connected to the other end of the second transmission shaft 40. The driving device 10 is configured to drive the second transmission shaft 40. The second transmission shaft 40 drives the second supporting leg 50 to rotate. In the above manner, when the driving device 10 drives the first transmission shaft 20 to rotate, the first supporting leg 30 of the landing gear 1 rotates. When the driving device 10 drives the second transmission shaft 40 to rotate, the second supporting leg 50 of the landing gear 1 rotates. The first supporting leg 30 or the second supporting leg 50 of the landing gear 1 may be retracted or extended. The landing gear 1 is applied to an unmanned aerial vehicle. When the first supporting leg 30 of the landing gear 1 is retracted, occlusion of the field of view in photography can be reduced and air resistance during flight is reduced. When the first supporting leg 30 of the landing gear 1 is extended, the unmanned aerial vehicle may be assisted to land on the ground to wait. When the second supporting leg 50 of the landing gear 1 is retracted, occlusion of the field of view in photography can be reduced and air resistance during flight is reduced. When the second supporting leg 50 of the landing gear 1 is extended, the unmanned aerial vehicle may be assisted in landing on the ground. When the first supporting leg 30 and the second supporting leg 50 of the landing gear 1 are retracted synchronously, occlusion of the field of view in photography can be reduced and air resistance during flight is reduced. When the first supporting leg 30 and the second supporting leg 50 of the landing gear 1 are simultaneously lowered and extended, the unmanned aerial vehicle may be assisted in landing stably on the ground.

Figure 3:
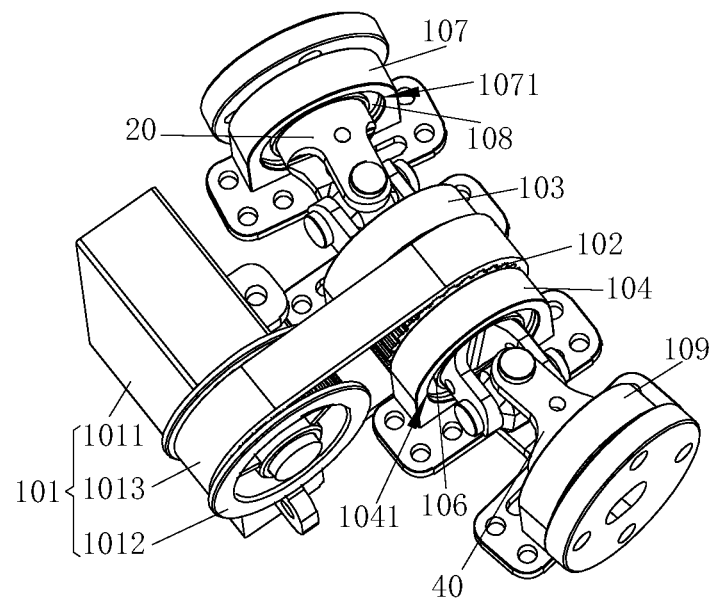
FIG. 3 is a schematic diagram of a driving device in one direction according to an embodiment of this disclosure.
Figure 4:
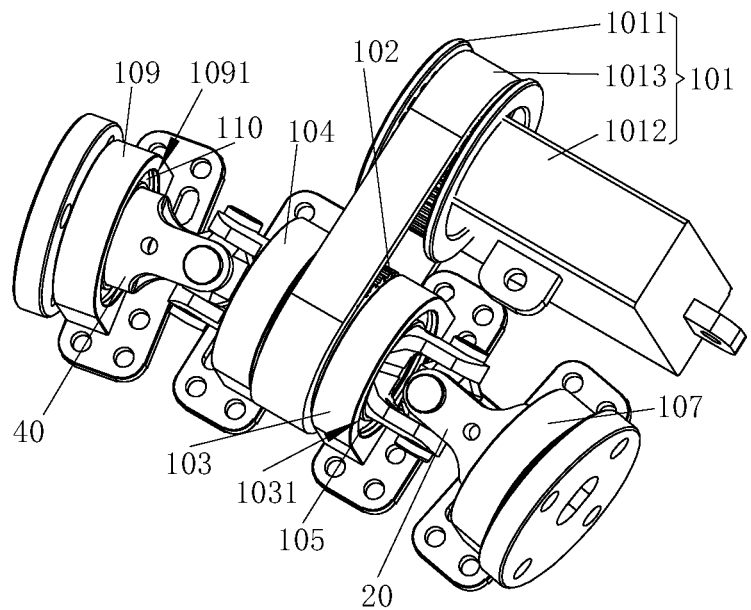
FIG. 4 is a schematic diagram of a driving device in another direction according to an embodiment of this disclosure.

For the aforementioned driving device 10, refer to FIG. 3 and FIG. 4. In some embodiments, the driving device 10 includes a driving assembly 101 and a synchronous wheel 102. The driving assembly 101 is configured to allow arrangement of an external object. The driving assembly 101 is connected to the synchronous wheel 102. The driving assembly 101 is configured to drive the synchronous wheel 102 to rotate. One end of the synchronous wheel 102 is connected to one end of the first transmission shaft 20. When the driving assembly 101 drives the synchronous wheel 102 to rotate, the synchronous wheel 102 drives the first transmission shaft 20 to rotate. The other end of the synchronous wheel 102 is connected to one end of the second transmission shaft 40. When the driving assembly 101 drives the synchronous wheel 102 to rotate, the synchronous wheel 102 drives the second transmission shaft 40 to rotate.

For the driving assembly 101, in some embodiments, the driving assembly 101 includes a driving unit 1011, a driving wheel 1012, and a synchronous belt 1013. The driving unit 1011 is configured to allow arrangement of an external object. The driving wheel 1012 is rotatably connected to the driving unit 1011. The synchronous belt 1013 is looped around the driving wheel 1012 and the synchronous wheel 102. The driving unit 1011 is configured to drive the driving wheel 1012 to rotate, thereby driving the synchronous wheel 102 to rotate, and then driving the first transmission shaft 20 and the second transmission shaft 40 to rotate.

In some embodiments, the driving device 10 further includes a first bracket 103, a second bracket 104, a first bearing 105, a second bearing 106, a third bracket 107, a third bearing 108, a fourth bracket 109, and a fourth bearing 110. The first bracket 103 is provided with a first through hole 1031. The first bearing 105 is mounted in the first through hole 1031. The second bracket 104 is provided with a second through hole 1041. The second bearing 106 is mounted in the second through hole 1041. The first bearing 105 is configured to be disposed on one end of the first transmission shaft 20. The second bearing 106 is configured to be disposed on one end of the second transmission shaft 40. The third bracket 107 is provided with a third through hole 1071. The third bearing 108 is mounted in the third through hole 1071. The third bearing 108 is configured to be disposed on the other end of the first transmission shaft 20. The fourth bracket 109 is provided with a fourth through hole 1091. The fourth bearing 110 is mounted in the fourth through hole 1091. The fourth bearing 110 is configured to be disposed on the other end of the second transmission shaft 40. In other words, the first bracket 103 and the third bracket 107 is configured to dispose the first transmission shaft 20 on an external object. The second bracket 104 and the fourth bracket 109 is configured to dispose the second transmission shaft 40 on an external object.

It is worth noting that the first bracket 103, the second bracket 104, the first bearing 105, the second bearing 106, the third bracket 107, the third bearing 108, the fourth bracket 109, and the fourth bearing 110 mentioned above may alternatively not be disposed, and functions of the driving device 10 driving the first transmission shaft 20 and the second transmission shaft 40 may also be achieved.

Figure 5:
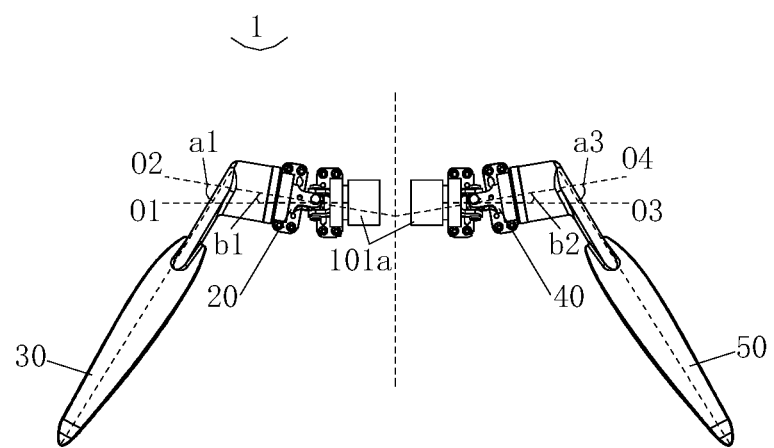
FIG. 5 is a schematic diagram of another implementation of a landing gear according to an embodiment of this disclosure.

It is worth noting that the driving device 10 is not limited to the foregoing structure, but may also have other implementations. For example, referring to FIG. 5, the driving device 10 includes two driving cells 101a, the two driving cells 101a both are configured to allow arrangement of an external object. One driving cell 101a is connected to one end of the first transmission shaft 20, and the other driving cell 101a is connected to one end of the second transmission shaft 40. One driving cell 101a is configured to drive the first transmission shaft 20, and the other driving cell 101a is configured to drive the second transmission shaft 40.

For the first transmission shaft 20 and the first supporting leg 30, refer to FIG. 2. One end of the first transmission shaft 20 is connected to the driving device 10. The other end of the first transmission shaft 20 is connected to the first supporting leg 30. The first transmission shaft 20 drives the first supporting leg 30 to rotate.

Refer to FIG. 2. The first transmission shaft 20 is rotatable about a first direction O1 and a second direction O2. The first transmission shaft 20 drives the first supporting leg 30 to rotate about the second direction O2. An included angle b1 between the first direction O1 and the second direction O2 is an acute angle.

In some embodiments, an angle range of the acute angle is between 30 and 60 degrees.

It is worth noting that an included angle a1 between a connection line from one end to the other end of the first supporting leg 20 and the second direction O2 is greater than zero. In other words, a connection line from one end to the other end of the first supporting leg 20 does not coincide with the second direction O2.

When the driving device 10 includes the driving assembly 101 and the synchronous wheel 102, one end of the synchronous wheel 102 drives the first transmission shaft 20 to rotate about the first direction O1 and the second direction O2.

When the driving device 10 includes one driving cell 101a, the driving cell 101a drives the first transmission shaft 20 to rotate about the first direction O1 and the second direction O2.

It is worth noting that in some embodiments, the first transmission shaft 20 is a universal shaft.

The first transmission shaft 20 rotates about the first direction O1 and the second direction O2, the driving device 10 drives the first transmission shaft 20 to rotate, and the first transmission shaft 20 drives the first supporting leg 30 to rotate about the second direction O2, so that a rotation flexibility of the first supporting leg 30 is good, and the landing gear 1 is applicable in a wide range of scenarios. Because the first transmission shaft 20 has two rotation directions, motion of the first supporting leg 30 relative to the driving device 10 is a three-dimensional spatial motion according to the trajectory when the first transmission shaft 20 drives the first supporting leg 30 to rotate, which is different from a situation in which the first transmission shaft 20 rotates about one single direction to implement retracting or lowering and extending in an inflexible single way, so that the landing gear 1 is applicable in different scenarios.

It may be understood that the first transmission shaft 20 rotates about the first direction O1 and the second direction O2, which is different from user's perception when the first transmission shaft 20 rotates about one single direction.

Figure 6:
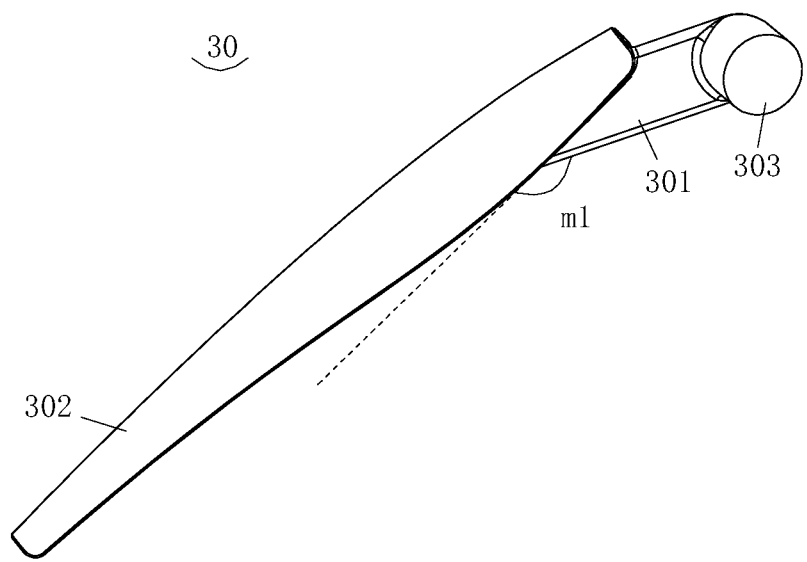
FIG. 6 is a schematic diagram of a first supporting leg according to an embodiment of this disclosure.

For the first supporting leg 30, refer to FIG. 6. The first supporting leg 30 comprises a first connecting arm 301, a second connecting arm 302, and a first connector 303. One end of the first connecting arm 301 is connected to the other end of the first transmission shaft 20. The other end of the first connecting arm 301 is connected to one end of the second connecting arm 302. One end of the first connector 303 is connected to the other end of the first transmission shaft 20. The other end of the first connector 303 is connected to one end of the first connecting arm 301. An included angle m1 between the first connecting arm 301 and the second connecting arm 302 is an obtuse angle. The other end of the second connecting arm 302 is configured to abut against an external object. When the first supporting leg 30 rotates to keep the other end of the second connecting arm 302 away from the first transmission shaft 20, because the included angle m1 between the first connecting arm 301 and the second connecting arm 302 is an obtuse angle, the other end of the second connecting arm 302 is close to one end of the first connecting arm 301, and a structure of the landing gear 1 is compact.

The first connector 303 is disposed between the first transmission shaft 20 and the first connecting arm 301, and a distance between the first transmission shaft 20 and the first connecting arm 301 may be adjusted by appropriately choosing a size of the first connector 303, to improve matching of the driving device 10 and the first supporting leg 30 in the landing gear 1.

It is worth noting that in some embodiments, the first connector 303 may alternatively not be disposed.

For the second transmission shaft 40 and the second supporting leg 50, refer to FIG. 2. One end of the second transmission shaft 40 is connected to the driving device 10. The other end of the second transmission shaft 40 is connected to the second supporting leg 50. The second transmission shaft 40 drives the second supporting leg 50 to rotate.

Refer to FIG. 2. The second transmission shaft 40 is rotatable about a third direction O3 and a fourth direction O4. The second transmission shaft 40 drives the second supporting leg 50 to rotate about the fourth direction O4. An included angle b2 between the third direction O3 and the fourth direction O4 is an acute angle.

In some embodiments, an angle range of the acute angle is between 30 and 60 degrees.

It is worth noting that an included angle a3 between a connection line from one end to the other end of the second supporting leg 50 and the fourth direction O4 is greater than zero. In other words, a connection line from one end to the other end of the second supporting leg 50 does not coincide with the fourth direction O4.

When the driving device 10 includes another driving cell 101a, the another driving cell 101a drives the second transmission shaft 40 to rotate about the third direction O3 and the fourth direction O4.

When the driving device 10 includes the driving assembly 101 and the synchronous wheel 102, the other end of the synchronous wheel 102 drives the second transmission shaft 40 to rotate about the third direction O3 and the fourth direction O4. Because one end of the synchronous wheel 102 drives the first transmission shaft 20 to rotate about the first direction O1 and the second direction O2, the other end of the synchronous wheel 102 drives the second transmission shaft 40 to rotate about the third direction O3 and the fourth direction O4. In other words, the driving device 10 drives the first supporting leg 30 and the second supporting leg 50 simultaneously, so that a structure of the landing gear 1 is compact.

It is worth noting that in some embodiments, the first direction O1 coincides with the third direction O3.

In some embodiments, the second direction O2 and the fourth direction O4 are symmetrical, so that the driving device 10 simultaneously drives the first supporting leg 30 and the second supporting leg 50 to move synchronously. A movement direction of the first supporting leg 30 and the second supporting leg 50 is the same, so that when the first supporting leg 30 and the second supporting leg 50 are synchronously lowered and extended, the unmanned aerial vehicle may be assisted in landing stably on the ground.

It is worth noting that in some embodiments, the second transmission shaft 40 is a universal shaft.

The second transmission shaft 40 rotates about the third direction O3 and the fourth direction O4, the driving device 10 drives the second transmission shaft 40 to rotate, and the second transmission shaft 40 drives the second supporting leg 50 to rotate about the fourth direction O4, so that a rotation flexibility of the second supporting leg 50 is good, and the landing gear 1 is applicable in a wide range of scenarios. Because the second transmission shaft 40 has two rotation directions, motion of the second supporting leg 50 relative to the driving device 10 is a three-dimensional spatial motion according to the trajectory when the second transmission shaft 40 drives the second supporting leg 50 to rotate, which is different from a situation in which the second transmission shaft 40 rotates about one single direction to implement lifting or lowering and extending in an inflexible single way, so that the landing gear 1 is applicable in different scenarios.

It may be understood that the second transmission shaft 40 rotates about the third direction O3 and the fourth direction O4, which is different from user's perception when the second transmission shaft 40 rotates about one single direction.

It may be understood that referring to FIG. 1, FIG. 3, and FIG. 4 together, when the driving device 10 includes a first bracket 103, a second bracket 104, a first bearing 105, and a second bearing 106, the first bracket 103 and the second bracket 104 is configured to allow arrangement of an external object, one end of the first transmission shaft 20 passes through the first bearing 105 and then is connected to one end of the synchronous wheel 102, and one end of the second transmission shaft 40 passes through the second bearing 106 and then is connected to the other end of the synchronous wheel 102. In other words, the first transmission shaft 20 may be disposed on an external object via the first bracket 103, and the second transmission shaft 40 may be disposed on an external object via the second bracket 104.

It may be understood that when the driving device 10 includes a third bracket 107 and a third bearing 108, the other end of the first transmission shaft 20 is fitted in the third bearing 108 and then connected to the first supporting leg 30. In other words, the first transmission shaft 20 may alternatively be disposed on an external object via the third bracket 107.

It may be understood that when the driving device 10 includes a fourth bracket 109 and a fourth bearing 110, the other end of the second transmission shaft 40 is fitted in the fourth bearing 110 and then connected to the second supporting leg 50. In other words, the second transmission shaft 40 may alternatively be disposed on an external object vis the fourth bracket 109.

For the second supporting leg 50, the second supporting leg 50 includes a third connecting arm (not shown), a fourth connecting arm (not shown), and a second connector (not shown). One end of the third connecting arm is connected to the other end of the second transmission shaft 40. The other end of the third connecting arm is connected to one end of the fourth connecting arm. One end of the second connector is connected to the other end of the second transmission shaft 40. The other end of the second connector is connected to one end of the third connecting arm. An included angle between the third connecting arm and the fourth connecting arm is an obtuse angle. The other end of the fourth connecting arm is configured to abut against an external object. When the second supporting leg 50 rotates to keep the other end of the fourth connecting arm away from the second transmission shaft 40, because the included angle between the third connecting arm and the fourth connecting arm is an obtuse angle, the other end of the fourth connecting arm is close to one end of the third connecting arm, and a structure of the landing gear 1 is compact.

The second connector is disposed between the second transmission shaft 40 and the third connecting arm, and a distance between the second transmission shaft 40 and the third connecting arm may be adjusted by appropriately choosing a size of the second connector, to improve matching of the driving device 10 and the first supporting leg 30 in the landing gear 1.

It is worth noting that in some embodiments, the second connector may alternatively not be disposed.

It is worth noting that the landing gear 1 is also provided with a controller (not shown). The controller is connected to the driving device 10. The controller is configured to control the driving device 10 to drive the first transmission shaft 20, and the controller is further configured to control the driving device 10 to drive the second transmission shaft 40. Program procedures involved in the controller use the existing program procedures. The controller also uses the existing processors, such as an Intel I3 processor, an AMD Ryzen processor, and the like.

In embodiments of this disclosure, a landing gear 1 includes a driving device 10, a first transmission shaft 20, and a first supporting leg 30. One end of the first transmission shaft 20 is connected to the driving device 10. The other end of the first transmission shaft 20 is connected to the first supporting leg 30. The driving device 10 is configured to drive the first transmission shaft 20 to rotate about a first direction O1 and a second direction O2. The first transmission shaft 20 drives the first supporting leg 30 to rotate about the second direction O2. An included angle b1 between the first direction O1 and the second direction O2 is an acute angle. By using the foregoing manner, when the driving device 10 drives the first transmission shaft 20 to rotate, and the first supporting leg 30 of the landing gear 1 rotates about the second direction O2, the first supporting leg 30 of the landing gear 1 may be retracted or extended. The landing gear 1 is used in the unmanned aerial vehicle. When the first supporting leg 30 of the landing gear 1 is retracted, occlusion of the field of view in photography can be reduced and air resistance during flight is reduced. When the first supporting leg 30 of the landing gear 1 is extended, the unmanned aerial vehicle may be assisted in landing on the ground. In addition, because the first transmission shaft 20 of the landing gear 1 in this disclosure is rotatable about the first direction O1 and the second direction O2, where an included angle b1 between the first direction O1 and the second direction O2 is an acute angle, compared with a case in which the first transmission shaft 20 rotates about one single direction, a rotation flexibility of the first supporting leg 30 of the landing gear 1 in this disclosure is high, so that the landing gear 1 is applicable in a wide range of scenarios. Moreover, because the first transmission shaft 20 has two rotation directions, a motion trajectory of the first supporting leg 30 relative to the driving device 10 is a three-dimensional spatial motion according to the trajectory when the first transmission shaft 20 drives the first supporting leg 30 to rotate, which is different from a situation in which the first transmission shaft 20 rotates about one single direction to implement lifting or lowering and extending in an inflexible single way, so that the landing gear 1 is applicable in different scenarios.

Alternatively, the driving device includes a driving assembly and a synchronous wheel. The driving assembly is connected to the synchronous wheel. One end of the synchronous wheel is connected to one end of the first transmission shaft. The driving assembly is configured to drive the synchronous wheel to rotate. The synchronous wheel drives the first transmission shaft to rotate about the first direction and the second direction.

Alternatively, the landing gear further includes a second transmission shaft and a second supporting leg. The second transmission shaft and the first transmission shaft are oppositely arranged on two sides of the synchronous wheel. One end of the second transmission shaft is connected to the other end of the synchronous wheel. The other end of the second transmission shaft is connected to the second supporting leg. When the driving assembly drives the synchronous wheel to rotate, the synchronous wheel drives the second transmission shaft to rotate about a third direction and a fourth direction, and the second transmission shaft drives the second supporting leg to rotate about the fourth direction. An included angle between the third direction and the fourth direction is an acute angle.

Alternatively, the third direction coincides with the first direction.

Alternatively, the driving device further includes a first bracket, a second bracket, a first bearing, and a second bearing. The first bracket is provided with a first through hole. The first bearing is mounted in the first through hole. The second bracket is provided with a second through hole. The second bearing is mounted in the second through hole. One end of the first transmission shaft passes through the first bearing and then is connected to one end of the synchronous wheel. One end of the second transmission shaft passes through the second bearing and then is connected to the other end of the synchronous wheel.

Alternatively, the driving device further includes a third bracket and a third bearing. The third bracket is provided with a third through hole. The third bearing is mounted in the third through hole. The other end of the first transmission shaft is fitted in the third bearing and then connected to the first supporting leg.

Alternatively, the driving device further includes a fourth bracket and a fourth bearing. The fourth bracket is provided with a fourth through hole. The fourth bearing is mounted in the fourth through hole. The other end of the second transmission shaft is fitted in the fourth bearing and then connected to the second supporting leg.

Alternatively, the driving assembly includes a driving unit, a driving wheel, and a synchronous belt. The driving wheel is rotatably connected to the driving unit. The synchronous belt is looped around the driving wheel and the synchronous wheel. The driving unit is configured to drive the driving wheel to rotate.

Alternatively, the first supporting leg includes a first connecting arm and a second connecting arm. One end of the first connecting arm is connected to the other end of the first transmission shaft. The other end of the first connecting arm is connected to the second connecting arm. An included angle between the first connecting arm and the second connecting arm is an obtuse angle.

Alternatively, the first supporting leg further includes a first connector. One end of the first connector is connected to the other end of the first transmission shaft. The other end of the first connector is connected to one end of the first connecting arm.

Figure 7:
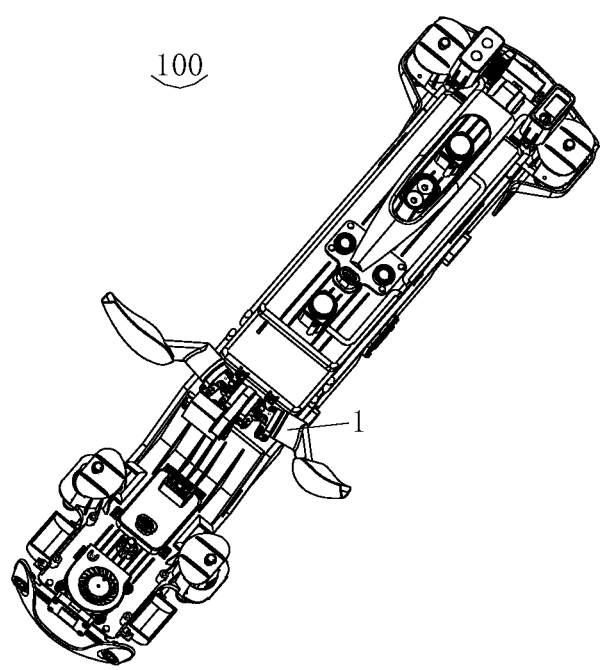
FIG. 7 is a schematic diagram of an unmanned aerial vehicle according to an embodiment of this disclosure.

An embodiment of this disclosure further provides an embodiment of an unmanned aerial vehicle. As shown in FIG. 7, the unmanned aerial vehicle 100 includes the landing gear. A specific structure and functions of the landing gear refer to the above embodiments. Details are not described herein again.

Beneficial effects in embodiments of this disclosure are: A landing gear is provided and includes a driving device, a first transmission shaft, and a first supporting leg. The driving device drives the first transmission shaft to rotate, and the first supporting leg of the landing gear rotates about a second direction and may be retracted or extended. The landing gear is used in the unmanned aerial vehicle. When the first supporting leg of the landing gear is retracted, occlusion of the field of view in photography can be reduced and air resistance during flight is reduced. When the first supporting leg of the landing gear is extended, the unmanned aerial vehicle may be assisted in landing on the ground. In addition, because the first transmission shaft of the landing gear in this disclosure is rotatable about the first direction and the second direction, where an included angle between the first direction and the second direction is an acute angle, compared with a case in which the first transmission shaft rotates about one single direction, a rotation flexibility of the first supporting leg of the landing gear in this disclosure is high, so that the landing gear is applicable in a wide range of scenarios. Moreover, because the first transmission shaft has two rotation directions, motion of the first supporting leg relative to the driving device is a three-dimensional spatial motion according to the trajectory when the first transmission shaft drives the first supporting leg to rotate, which is different from a situation in which the first transmission shaft rotates about one single direction to implement lifting or lowering in an inflexible single way, so that the landing gear is applicable in different scenarios.

In addition, when the landing gear includes the second supporting leg, the synchronous lifting and lowering of the first supporting leg and the second supporting leg may be implemented. The synchronous lifting of the first supporting leg and the second supporting leg may reduce the occlusion during photographing and reduce air resistance of the unmanned aerial vehicle during flight. When the first supporting leg and the second supporting leg are simultaneously lowered, the unmanned aerial vehicle may be assisted in landing stably on the ground.

It should be noted that exemplary embodiments of this disclosure are provided in the specification and accompanying drawings of this disclosure. However, this disclosure may be implemented in many different forms, and is not limited to the embodiments described in the specification. These embodiments are not considered as additional restrictions on the content of this disclosure. The objective of providing these embodiments is to enable a more thorough and comprehensive understanding of the disclosure of this disclosure. Moreover, embodiments that are not listed above formed by combining the foregoing technical features are regarded as falling within the scope of the specification of this disclosure. In addition, for a person of ordinary skill in the art, improvements or modifications may be made according to the above descriptions, and all these improvements and modifications shall fall within the protection scope of the appended claims of this disclosure.

What is claimed is:

1. A landing gear, comprising:
   a driving device;
   a first transmission shaft, wherein first end of the first transmission shaft is connected to the driving device; and
   a first supporting leg, connected to the second of the first transmission shaft, wherein the driving device is configured to drive the first transmission shaft to rotate about a first direction and a second direction, the first transmission shaft drives the first supporting leg to rotate about the second direction, and a first included angle between the first direction and the second direction is an acute angle.

2. The landing gear according to claim 1, wherein the driving device comprises a driving assembly and a synchronous wheel, the driving assembly is connected to the synchronous wheel, a first end of the synchronous wheel is connected to a first end of the first transmission shaft, the driving assembly is configured to drive the synchronous wheel to rotate, and the synchronous wheel drives the first transmission shaft to rotate about the first direction and the second direction.

3. The landing gear according to claim 2, wherein
   the landing gear further comprises a second transmission shaft and a second supporting leg, the second transmission shaft and the first transmission shaft are oppositely arranged on two sides of the synchronous wheel, a first end of the second transmission shaft is connected to a second end of the synchronous wheel, and a second end of the second transmission shaft is connected to the second supporting leg; and
   when the driving assembly drives the synchronous wheel to rotate, the synchronous wheel drives the second transmission shaft to rotate about a third direction and a fourth direction, the second transmission shaft drives the second supporting leg to rotate about the fourth direction, and an second included angle between the third direction and the fourth direction is an acute angle.

4. The landing gear according to claim 3, wherein the third direction coincides with the first direction.

5. The landing gear according to claim 3, wherein
   the driving device further comprises a first bracket, a second bracket, a first bearing, and a second bearing; and
   the first bracket is provided with a first through hole, the first bearing is mounted in the first through hole, the second bracket is provided with a second through hole, the second bearing is mounted in the second through hole, the first end of the first transmission shaft passes through the first bearing and then is connected to the first end of the synchronous wheel, and the first end of the second transmission shaft passes through the second bearing and then is connected to the second end of the synchronous wheel.

6. The landing gear according to claim 3, wherein the driving device further comprises a third bracket and a third bearing, the third bracket is provided with a third through hole, the third bearing is mounted in the third through hole, and the second end of the first transmission shaft is fitted in the third bearing and then connected to the first supporting leg.

7. The landing gear according to claim 3, wherein the driving device further comprises a fourth bracket and a fourth bearing, the fourth bracket is provided with a fourth through hole, the fourth bearing is mounted in the fourth through hole, and the second end of the second transmission shaft is fitted in the fourth bearing and then connected to the second supporting leg.

8. The landing gear according to claim 2, wherein the driving assembly comprises a driving unit, a driving wheel, and a synchronous belt; the driving wheel is rotatably connected to the driving unit; the synchronous belt is looped around the driving wheel and the synchronous wheel; and the driving unit is configured to drive the driving wheel to rotate.

9. The landing gear according to claim 1, wherein the first supporting leg comprises a first connecting arm and a second connecting arm, a first end of the first connecting arm is connected to the second end of the first transmission shaft, a second end of the first connecting arm is connected to the second connecting arm, and a third included angle between the first connecting arm and the second connecting arm is an obtuse angle.

10. The landing gear according to claim 9, wherein the first supporting leg further comprises a first connector, a first end of the first connector is connected to the second end of the first transmission shaft, and a second end of the first connector is connected to the first end of the first connecting arm.

11. The landing gear according to claim 3, wherein the drive device comprises a first drive cell and a second drive cell, the first drive cell is connected to the first end of the first transmission shaft, the first drive cell is configured to drive the first transmission shaft to rotate, the second drive cell is connected to the first end of the second transmission shaft, the second drive cell is configured to drive the second transmission shaft to rotate.

12. The landing gear according to claim 3, wherein the second supporting leg comprises a third connecting arm and a fourth connecting arm, a first end of the third connecting arm is connected to the second end of the second transmission shaft, a second end of the third connecting arm connected to a first end of the fourth connecting arm, and an fourth included angle between the first connecting arm and the second connecting arm is an obtuse angle.

13. An unmanned aerial vehicle, comprising a landing gear, wherein the landing gear comprises:

a driving device;
a first transmission shaft, wherein first end of the first transmission shaft is connected to the driving device; and
a first supporting leg, connected to the second of the first transmission shaft, wherein the driving device is configured to drive the first transmission shaft to rotate about a first direction and a second direction, the first transmission shaft drives the first supporting leg to rotate about the second direction, and a first included angle between the first direction and the second direction is an acute angle.

14. The unmanned aerial vehicle according to claim 13, wherein the driving device comprises a driving assembly and a synchronous wheel, the driving assembly is connected to the synchronous wheel, a first end of the synchronous wheel is connected to a first end of the first transmission shaft, the driving assembly is configured to drive the synchronous wheel to rotate, and the synchronous wheel drives the first transmission shaft to rotate about the first direction and the second direction.

15. The unmanned aerial vehicle according to claim 14, wherein the landing gear further comprises a second transmission shaft and a second supporting leg, the second transmission shaft and the first transmission shaft are oppositely arranged on two sides of the synchronous wheel, a first end of the second transmission shaft is connected to a second end of the synchronous wheel, and a second end of the second transmission shaft is connected to the second supporting leg; and
when the driving assembly drives the synchronous wheel to rotate, the synchronous wheel drives the second transmission shaft to rotate about a third direction and a fourth direction, the second transmission shaft drives the second supporting leg to rotate about the fourth direction, and an second included angle between the third direction and the fourth direction is an acute angle.

16. The unmanned aerial vehicle according to claim 15, wherein the third direction coincides with the first direction.

17. The unmanned aerial vehicle according to claim 15, wherein the drive device comprise a first drive cell and a second drive cell, the first drive cell is connected to the first end of the first transmission shaft, the first drive cell is configured to drive the first transmission shaft to rotate, the second drive cell is connected to the first end of the second transmission shaft, the second drive cell is configured to drive the second transmission shaft to rotate.

18. The unmanned aerial vehicle according to claim 17, wherein the second supporting leg comprised a third connecting arm and a fourth connecting arm, a first end of the third connecting arm is connected to the second end of the second transmission shaft, a second end of the third connecting arm connected to a first end of the fourth connecting arm, and an fourth included angle between the first connecting arm and the second connecting arm is an obtuse angle.

* * * * *